US006991412B2

(12) United States Patent
Dorrian

(10) Patent No.: US 6,991,412 B2
(45) Date of Patent: Jan. 31, 2006

(54) TRANSPORT DEVICE

(75) Inventor: Michael Dorrian, Newmarket (CA)

(73) Assignee: Honda Canada, Inc., (CA)

( * ) Notice: Subject to any disclaimer, the term of this patent is extended or adjusted under 35 U.S.C. 154(b) by 134 days.

(21) Appl. No.: 10/377,106

(22) Filed: Mar. 3, 2003

(65) Prior Publication Data

US 2004/0084590 A1 May 6, 2004

Related U.S. Application Data

(60) Provisional application No. 60/361,275, filed on Mar. 4, 2002.

(51) Int. Cl.
*B60P 7/08* (2006.01)

(52) U.S. Cl. ............................ 410/43; 410/33; 410/46; 410/69; 410/80

(58) Field of Classification Search ............ 410/31–33, 410/43, 46, 69, 80–81; 269/17, 47, 133; 280/79.3
See application file for complete search history.

(56) References Cited

U.S. PATENT DOCUMENTS 342,187 A 5/1886 Cornell
740,802 A * 10/1903 Brown
1,161,983 A 11/1915 Schultz
2,331,416 A 10/1943 Muller, Sr.
2,533,352 A 12/1950 Chapman et al.
2,573,728 A 11/1951 Pugh, Sr.
2,588,732 A 3/1952 Kemp, Jr.
2,665,018 A 1/1954 Salsas
2,704,167 A 3/1955 Framheln
3,084,820 A 4/1963 Malo
3,795,324 A 3/1974 Kiwalle
3,828,953 A 8/1974 Reznicek
4,564,178 A 1/1986 Steffe
4,739,872 A 4/1988 Roberts et al.
5,072,918 A 12/1991 Campbell
5,174,701 A 12/1992 Small .......................... 410/47
5,277,412 A 1/1994 Pringle
5,318,316 A 6/1994 Shurtleff (Continued)

FOREIGN PATENT DOCUMENTS

EP 0 372 191 A2 6/1990

(Continued)

*Primary Examiner*—Stephen Gordon
(74) *Attorney, Agent, or Firm*—Katten Muchin Rosenman LLP

(57) ABSTRACT

Disclosed is a device for transporting automotive instrument panels, comprising a frame, a pair of carry arms pivoted to the frame to carry opposite sides of an instrument panel, each carry arm having an outer end section which is provided with a carry formation for engaging a complementary carry formation on a corresponding side of the instrument panel; the instrument panel having a central column region with a lower column end portion, both of said carry arms having an inner end section which is positioned to lie in the path of the lower column end portion as it is lowered onto the frame, said carry arms being further arranged to be displaced downwardly as the instrument panel is lowered to a carry elevation relative to the frame, the downward displacement of the carry arms by the instrument panel causing the carry formations on the arms positively to engage the complementary carry formations on the instrument panel.

23 Claims, 13 Drawing Sheets

U.S. PATENT DOCUMENTS

| | | | | |
|---|---|---|---|---|
| 5,507,509 | A | 4/1996 | Della Polla, Jr. | |
| 5,791,855 | A | 8/1998 | Dixon | |
| 5,876,165 | A * | 3/1999 | Campbell | 410/43 |
| 5,964,457 | A | 10/1999 | Guajardo | |
| 6,565,299 | B1 * | 5/2003 | Guilbault et al. | 410/69 |
| 6,786,687 | B1 * | 9/2004 | Schroeder | 410/43 |

FOREIGN PATENT DOCUMENTS

| | | |
|---|---|---|
| EP | 0 705 770 A2 | 10/1996 |
| JP | 6-206582 | 7/1994 |
| JP | 11-254998 | 9/1999 |
| SU | 908565 | 3/1980 |

* cited by examiner 60
62
66
64
20a
20c
20
22a
22
16b
46
68
14
52
34a
34
16
12
32
30
40
50
42
44

16a
h 16b
49
Φ

TRANSPORT DEVICE

REFERENCE TO CO-PENDING APPLICATIONS

The entire subject matter of U.S. Provisional application Ser. No. 60/361,275 filed Mar. 4, 2002 and entitled TRANSPORT DEVICE is incorporated by reference. The applicant claims priority benefit under Title 35, United States Code, Section 119(e) of U.S. Provisional application Ser. No. 60/361,275 filed Mar. 4, 2002 and entitled TRANSPORT DEVICE.

BACKGROUND OF THE INVENTION

1. Field of the Invention

The present invention relates to the transport of articles, more particularly those which are complex and prone to damage, still more particularly but not exclusively, to instrument panels and other electronics-bearing components used in the automobile industry.

2. Description of the Related Art

An important component in the assembly of an automobile is the instrument panel. It is unique because it contains many electronic components and is of a rather unusual shape. The instrument panel can be described as elongate with a central axis, which extends across the vehicle it is installed in. On one side of the axis is an exterior front face which must be kept out of contact with objects that can damage its outer finish. On an opposite side, the instrument panel has exposed wires, cables, heating ducts, dials, gauges and the like and must also be protected from damaging contact with external objects.

The equipment and methods to move instrument panels have tended to be manual and time consuming. The instrument panel is usually transported from an instrument panel assembly line to a vehicle assembly line by way of a wheeled cart. The instrument panel is guided to the cart by way of a gantry assist device and installed by guiding one end of the instrument panel to rest on a support flange and manually engaging an anchoring pin on the opposite end of the instrument panel so that the cart can hold it in place. The instrument panel is thus only supported at two locations. The instrument panel is then removed from the cart when a robot has been instructed to clutch the instrument panel and after an employee has acknowledged that he has manually disengaged the anchoring pin.

Though the conventional cart has functioned well for its intended purpose, the manner in which the instrument panel is loaded, supported and unloaded is problematic. The use of one anchoring pin on one end of the instrument panel and the lack of any additional support tends to cause the instrument panel to flex in torsion along its axis. The unpinned end is not positively engaged and this causes the instrument panel to twist to an undesirable position which must then be accommodated when aligning the pick-up robot for unloading the instrument panel from the cart. This results in a considerable amount of process time and manpower to load and unload instrument panels onto and off these conventional transport carts.

It is therefore an object of the present invention to provide a novel device and method of transporting articles, such as instrument panels.

SUMMARY OF THE INVENTION

In one of its aspects, the present invention involves a device for transporting automotive instrument panels, comprising:

a frame, a pair of carry arms pivoted to the frame to carry opposite sides of an instrument panel, each carry arm having an outer end section which is provided with a carry formation for engaging a complementary carry formation on a corresponding side of the instrument panel;

the instrument panel having a central column region with a lower column end portion, both of said carry arms having an inner end section which is positioned to lie in the path of the lower column end portion as it is lowered onto the frame, said carry arms being further arranged to be displaced downwardly as the instrument panel is lowered to a carry elevation relative to the frame, the downward displacement of the carry arms by the instrument panel causing the carry formations on the arms positively to engage the complementary carry formations on the instrument panel.

In one embodiment, the carry arms are arranged to lie in a common plane which is generally parallel with an elongate axis on the instrument panel.

In one embodiment, the carry formation on each of the arms is at least one pin and the corresponding carry formation on the instrument panel includes at least one passage to receive the pin. The inner end section of each arm is further provided with a capture formation and each capture formations is arranged to form a seat for the lower column end portion of the instrument panel when the instrument panel reaches its carry elevation relative to the frame.

In one embodiment, the capture formation includes a plate and an upstanding peripheral wall to engage opposed laterally spaced side edge regions of the lower column end portion. In this case, the plate is laterally offset relative to the corresponding arm.

In one embodiment, each arm has an elongate portion extending between the capture formation and the carry formation, and each elongate portion is pivoted to the frame.

In one embodiment, the device further comprises a support member centrally located on the frame member and positioned to be between the inner end sections of the arms when the instrument panel reaches its carry elevation. In this case, the support member is positioned substantially parallel with and between the plates to support the lower column end portion when the instrument panel reaches its carry elevation. The upstanding peripheral walls of the capture formations are aligned with one another when the instrument panel reaches its carry elevation. Each upstanding peripheral wall includes an inclined portion to guide the lower column end portion.

In one embodiment, each pin is adjustable relative to the corresponding carry arm to adjust the instrument panel's carry elevation. In this case, the device further includes an adjustment assembly for adjusting the position of each carry formation relative to the capture formation. The adjustment assembly includes a housing positioned on each carry arm, wherein the pin is mounted for movement relative to the housing, further comprising anchor means for anchoring the location of the pin relative to the housing.

In one embodiment, the device further comprises biasing means for biasing each arm toward an open position wherein the arms are ready to receive an instrument panel. For example, a pair of posts may be arranged to extend upwardly from the frame member and providing a pivot location for a corresponding carry arm, the biasing means further including at least one spring between each post and the corresponding carry arm.

In one embodiment, the device further comprises a wheeled undercarriage for supporting the frame along a floor surface, the frame including a lower frame member which is generally parallel with the floor surface and the elongate portion of each arm includes a first segment adjacent the capture location, the first segment being generally parallel to the lower frame member when the instrument panel reaches its carry elevation relative to the frame.

In one embodiment, the first segment of each arm lies adjacent the frame member when the instrument panel reaches its carry elevation relative to the frame. Each arm includes a second segment which is disposed at angle relative to the first segment and has an included angle therewith of greater than 90 degrees and less than 180 degrees, wherein the second segment is upwardly angled from the first segment when the instrument panel has reached its carry elevation. Each arm includes a third segment which is disposed at an angle relative to the second segment and has an included angle therewith of greater than 90 degrees and less than 180 degrees, wherein the third segment is generally vertically directed when the instrument panel has reached its carry elevation, and the third segment supports the carry formation. In this case, the carry formation is located adjacent the third segment or in some other arrangement as needed to position the carry formation on the arm with a corresponding carry formation on the instrument panel.

In one embodiment, the arms are movable between a closed position where the complementary formations of the arms are in positive engagement with the complementary formations of the instrument panel and the first segments are adjacent the frame member and an open position wherein the first segments are inclined relative to the frame member, the arms being further arranged to fall to the open position in the absence of an instrument panel, under the force of gravity or a biasing source or both.

In another of its aspects, the present invention provides a device for transporting irregularly shaped articles, comprising:

a frame which is movable from a pickup location to an unloading location, a pair of carry arms pivoted to the frame in order to carry opposite sides of an irregularly shaped article, each carry arm having an outer end which is provided with a carry formation for positively engaging a complementary carry formation on a corresponding side of the article;

the article having a central body region with a lower body end portion, both of said carry arms having an inner end section which is positioned to lie in the path of the lower body end portion as it is lowered onto the frame, said carry arms being further arranged to be displaced downwardly as the article is lowered to a carry elevation relative to the frame, the downward displacement of the carry arms by the article causing the carry formations on the arms positively to engage the complementary carry formations on the article.

In still another of its aspects, the present invention provides a method of supporting irregularly shaped articles on a carrier, comprising:

providing a frame, pivotally mounting a pair of carry arms to the frame in order to carry opposite sides of an irregularly shaped article;

locating a carry formation on an outer end section of each carry arm for positively engaging a complementary carry formation on a corresponding side of the article;

locating an inner end section of each carry arm in order to obstruct the path of a central portion of the article as it reaches a carry elevation relative to the frame;

aligning the carry formations on the arms positively to engage the carry formations on the article while displacing the article toward the frame until the central portion of the article engages the central region on each carry arm;

displacing the article to cause a corresponding displacement of the central portions of the carry arms to advance the positive engagement of the carry formations between the article and the arms, until the article reaches a carry elevation relative to the frame.

In still another of its aspects, the present invention provides a method of supporting automotive instrument panels on a carrier, comprising:

providing a frame, pivotally mounting a pair of carry arms to the frame in order to carry opposite sides of an instrument panel;

locating a carry formation on an outer end section of each carry arm for positively engaging a complementary carry formation on a corresponding side of the instrument panel;

locating an inner end section of each carry arm in order to obstruct the path of a central portion of the instrument panel as it reaches a carry elevation relative to the frame;

aligning the carry formations on the arms positively to engage the carry formations on the instrument panel while displacing the instrument panel toward the frame until the central portion of the instrument panel engages the central region on each carry arm;

displacing the instrument panel to cause a corresponding displacement of the central portions of the carry arms to advance the positive engagement of the carry formations between the instrument panel and the arms, until the instrument panel reaches a carry elevation relative to the frame.

In one embodiment, the carry formation on each of the arms is at least one pin and the corresponding carry formation on the instrument panel includes at least one passage to receive the pin. The central portion of the instrument panel includes a column having a lower column end portion, further comprising the steps of:

providing each inner end section of each arm with a capture formation, arranging each capture formation to form a seat for the central portion of the instrument panel when the instrument panel reaches its carry elevation relative to the frame.

In one embodiment, the method further includes step of adjustably mounting the pin to the arm, so that the position of the pin may be adjusted relative thereto.

In yet another of its aspects, the present invention provides a device for transporting automotive instrument panels, comprising:

frame means, a pair of carry means pivoted to the frame means for carrying opposite sides of an instrument panel, each carry means having an outer end section which is provided with a carry formation for engaging a complementary carry formation on a corresponding side of the instrument panel;

the instrument panel having a central column region with a lower column end portion, both of said carry arm means having an inner end section which is positioned to lie in the path of the lower column end portion, said carry arm means being further arranged to be displaced downwardly as the instrument panel is lowered to a carry elevation relative to the frame, the downward displacement of the carry arms by the instrument panel causing the carry formations on the arms positively to engage the complementary carry formations on the instrument panel.

In one embodiment, the carry formation is located adjacent the third segment or in some other arrangement as needed to position the carry formation on the arm with a corresponding carry formation on the instrument panel.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
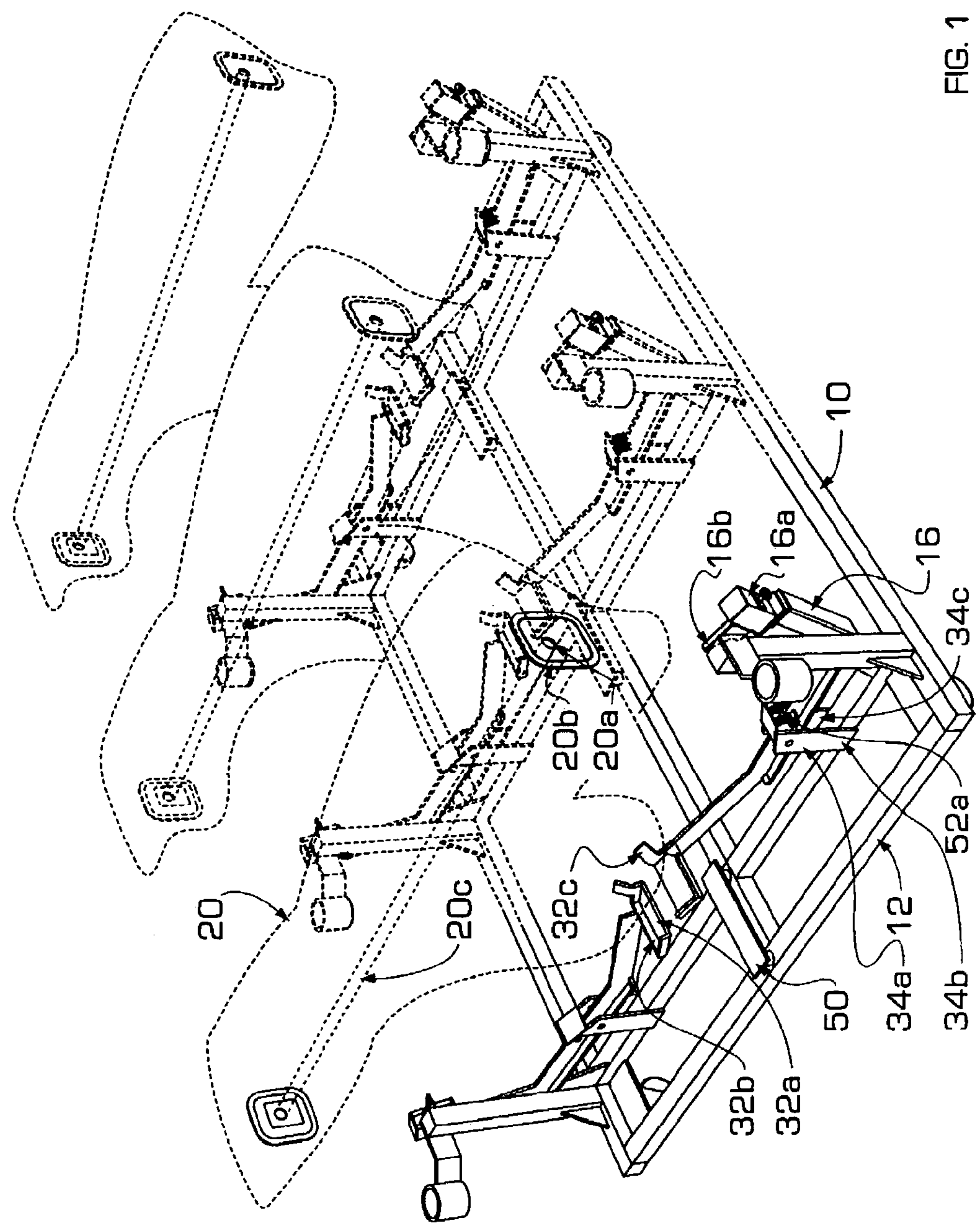
FIG. 1 is a fragmentary perspective view of a transport device.
Figure 1A:
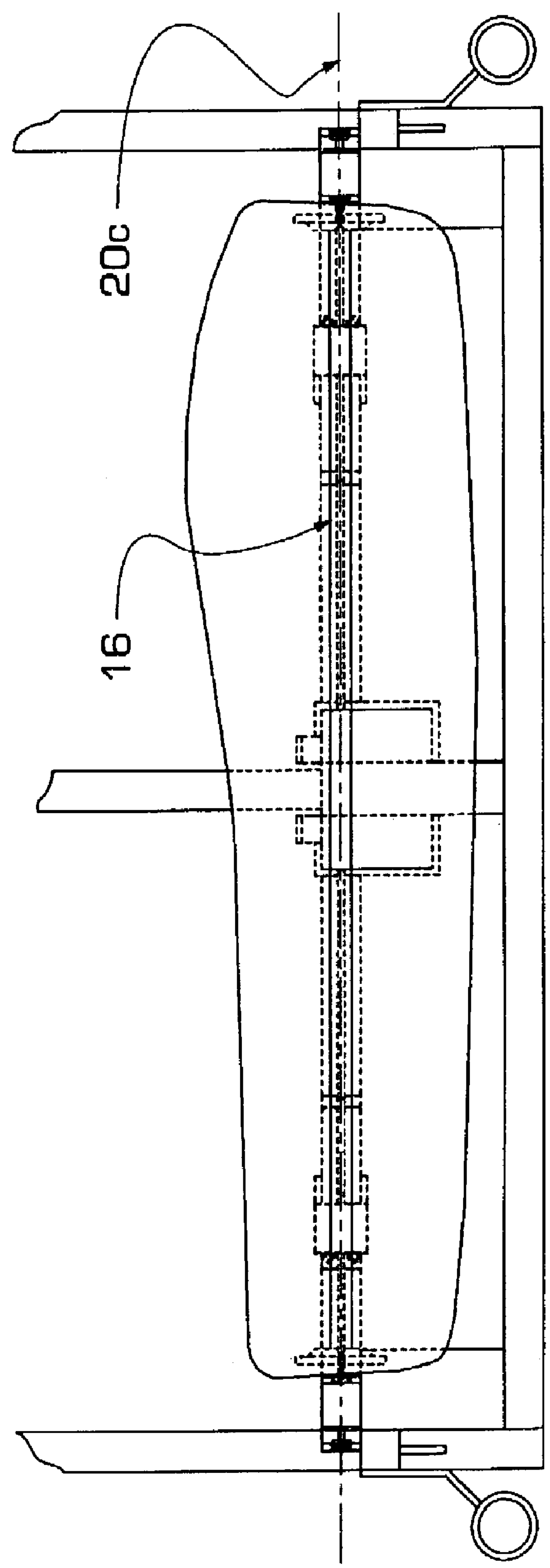
FIG. 1*a* is a fragmentary plan view of a portion of the transport device of FIG. 1.
Figure 1B:
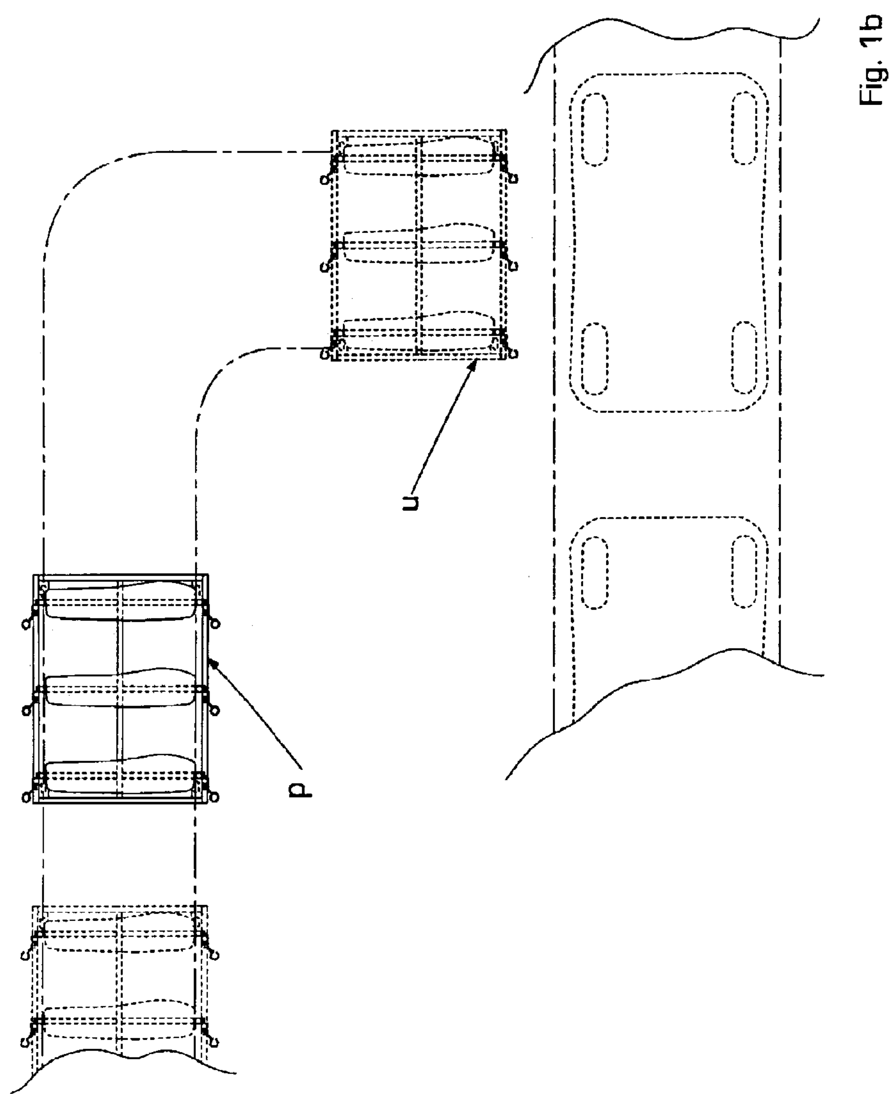
FIG. 1*b* is a schematic plan view of the transfer device in an assembly installation.
Figure 4:
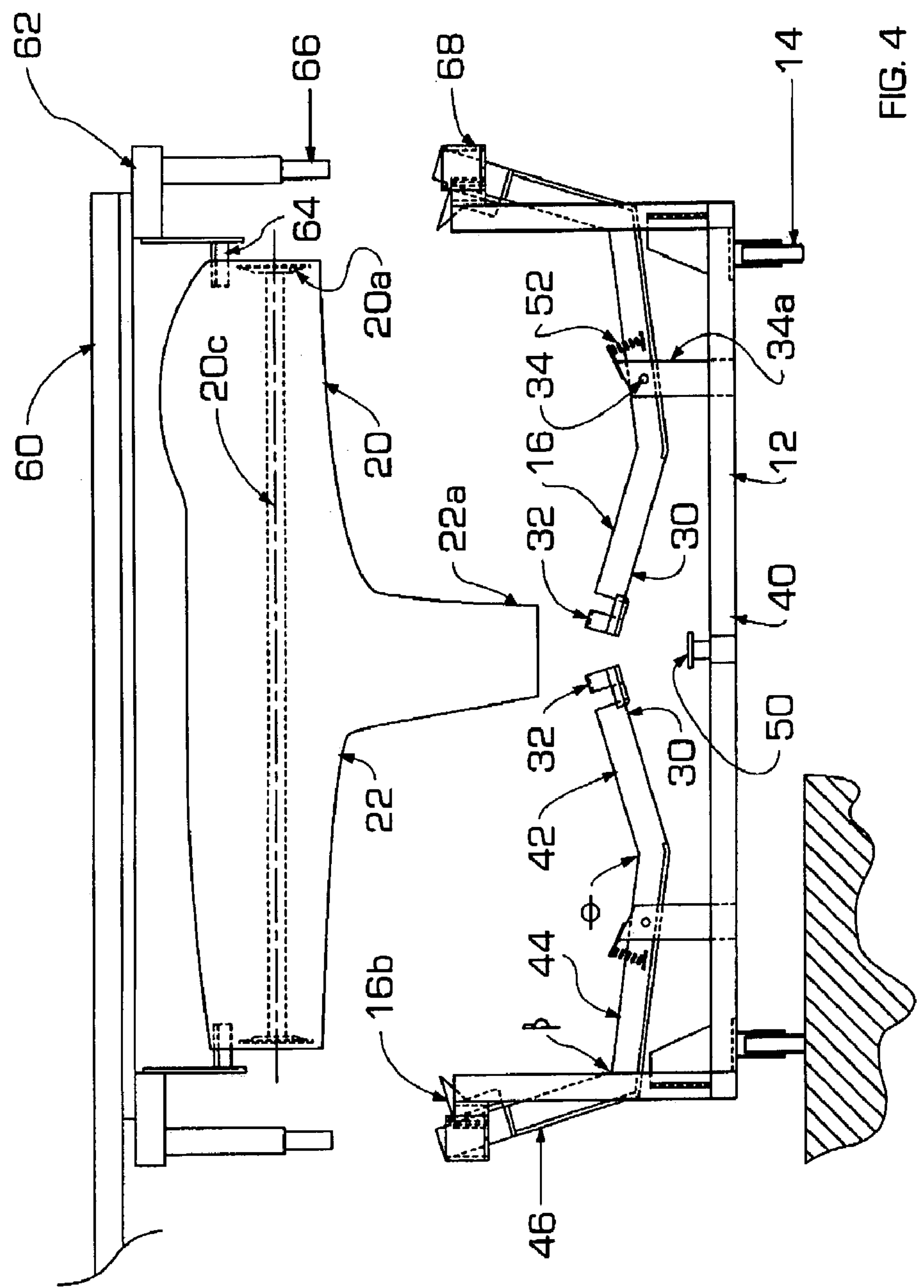
FIG. 4 is a side view of the transport unit in the operative position of FIG. 1.

The figures, particularly FIGS. 1, 1*b* and 4, illustrate a device 10 for transporting automotive instrument panels, having a frame 12 which is movable from a pickup location “p” to an unloading location “u”. The frame rolls on an undercarriage 14. The pickup location is typically at the termination of an instrument panel assembly line. The unloading location “u” is typically adjacent a vehicle assembly line and near where the instrument panel is installed.

The device 10 has a pair of carry arms 16 which are pivoted to the frame and in line with one another when viewed from above, in order to carry opposite sides of an instrument panel. Each carry arm 16 has an outer end 16*a* which is provided with a carry formation 16*b* for positively engaging a complementary carry formation 20*a* on a corresponding side of the instrument panel, shown at 20. The carry formation 16*b* is, in this case, a pin and the carry formation 20*a* is a passage, formed in a carry plate 20*b*. The carry plate is mounted on one end of a central tube frame 20*c* extending through the instrument panel 20. There is usually only one such carry plate 20*b* on one end of the instrument panel so that the latter may be attached, via the plate 20*b*, to a designated location on the chassis of a vehicle. To this end, the carry plate 20*b* is provided with other mounting features which are not shown for the sake of brevity.

Figure 5:
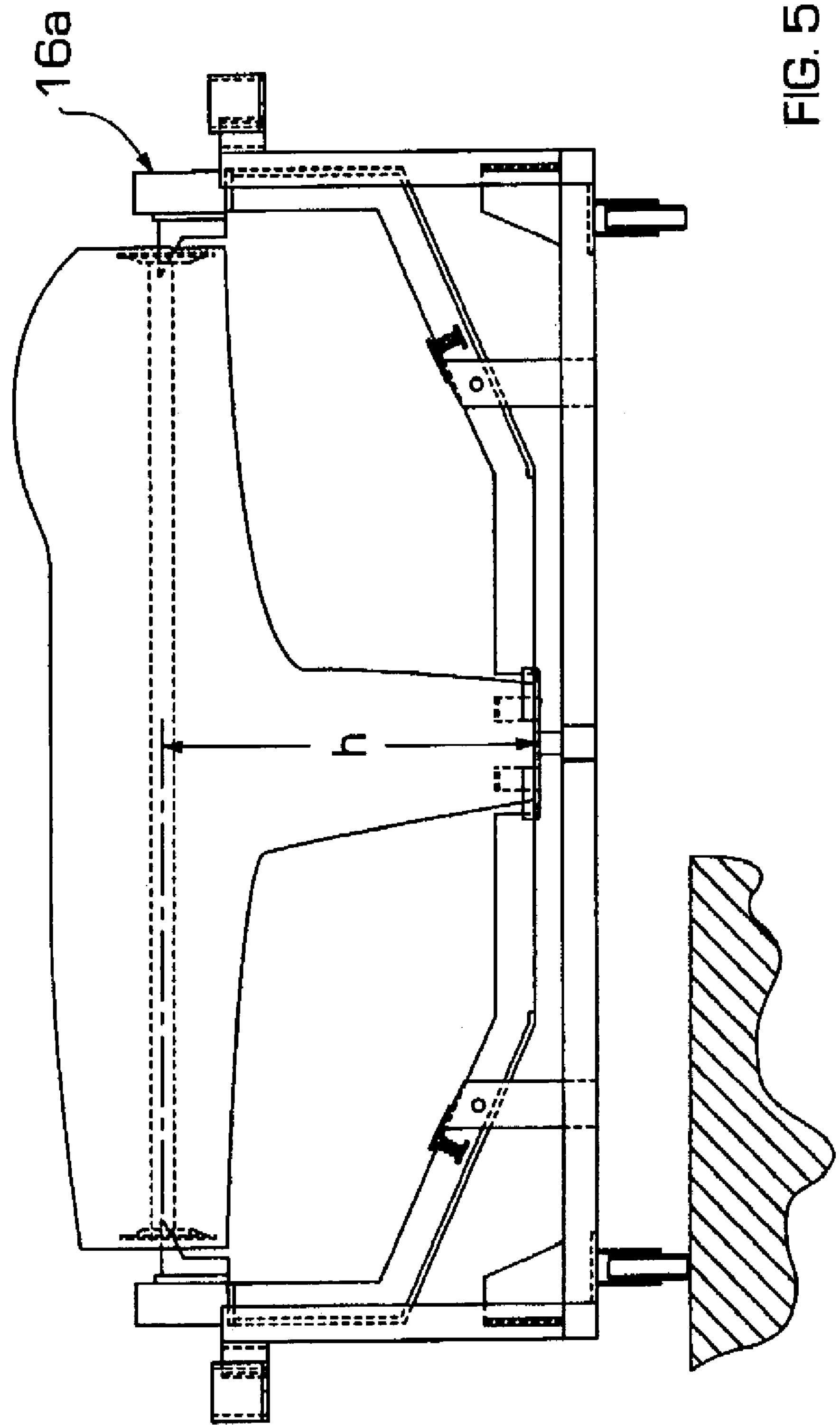
FIG. 5 is a side view of the transport unit in the operative position of FIG. 3.

Referring to FIG. 4, the instrument panel has a central column region 22 with a lower column end portion 22*a*. Both carry arms have an inner end section 30 which is positioned to lie in the path of the lower column end portion 22*a* as it is lowered onto the frame. In this case, the carry arms are further arranged to be displaced downwardly as the instrument panel is lowered to a carry elevation relative to the frame. The carry elevation corresponds to the position where the instrument panel is positively engaged by the device 10, as shown in FIG. 5. The downward displacement of the carry arms by the instrument panel in turn causes the arms to pivot or swing which in turn causes the pins 16*b* on the arms positively to engage the complementary passages 20*a* on the instrument panel.

Preferably, the carry arms are in a plane which is be generally parallel with an elongate axis 20*c* on the instrument panel, when viewed from above, as shown in FIG. 1*a*, though the alignment of the arms with the elongate axis of the instrument panel may not be critical to ensure that the instrument panel is successfully captured by the device 10.

Referring to FIGS. 1 and 4, to improve the positioning of the instrument panel on the device 10, the inner end section of each arm is further provided with a capture formation 32. The capture formations are arranged to form a seat for the lower column end portion of the instrument panel when the instrument panel reaches its carry elevation relative to the frame. Each capture formation includes a plate 32*a*, which is offset from the corresponding carry arm, and an upstanding peripheral wall 32*b* extending around three sides of the plate 32*a*, to engage opposed laterally spaced side edge regions of the lower column end portion. The peripheral wall 32*b* may be positioned to provide some clearance between it and the lower column end portion, for example to avoid damage to the latter during the positioning procedure. In addition, the peripheral wall 32*b* includes an inclined portion 32*c* to assist in guiding the lower column end portion on to the capture formation. More than one such inclined portion 32*c* may be provided on one or more other sides of the capture formation, as desired. In this case, the plates of both capture formations 32 lie adjacent one another with the support plate 50 there between to form a composite surface on which the lower column end region rests on the cart.

Figure 1C:
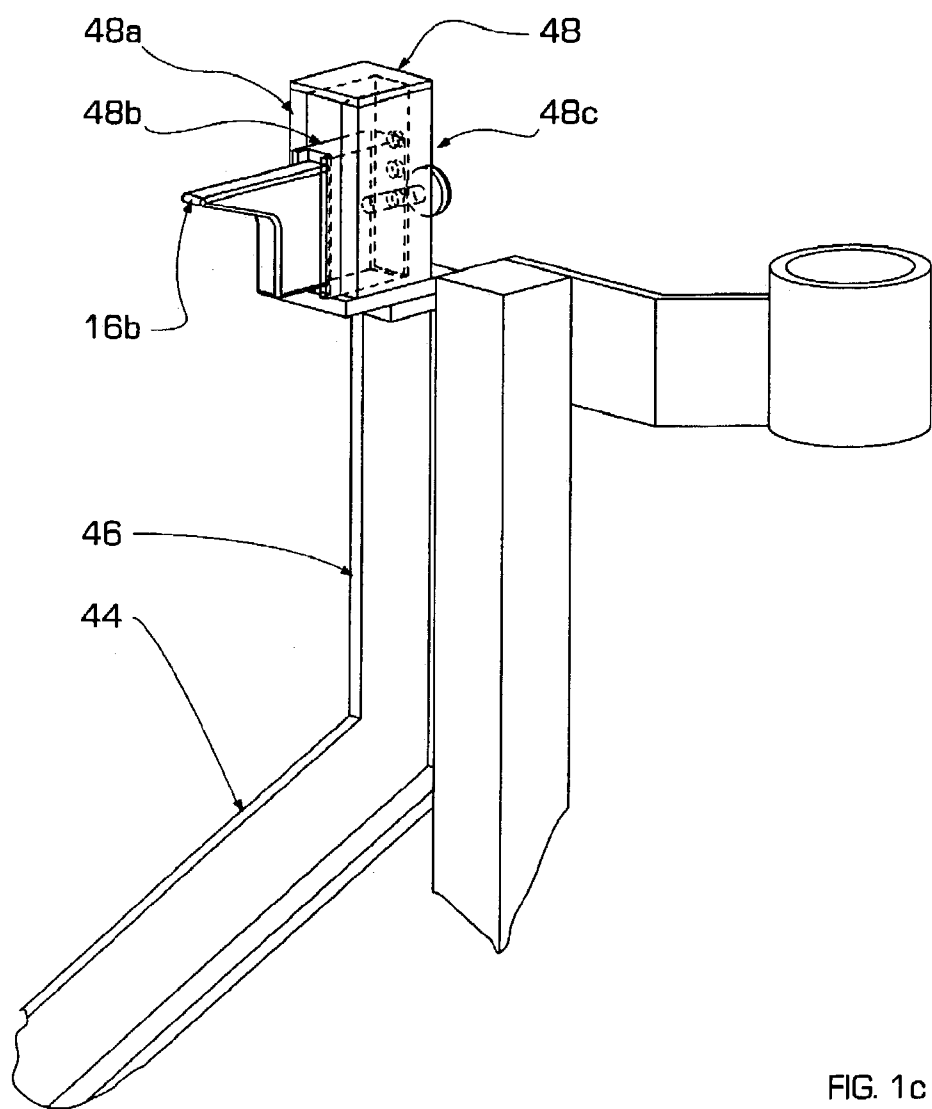
FIG. 1*c* is a fragmentary perspective view of another portion of the device of FIG. 1.
Figure 1D:
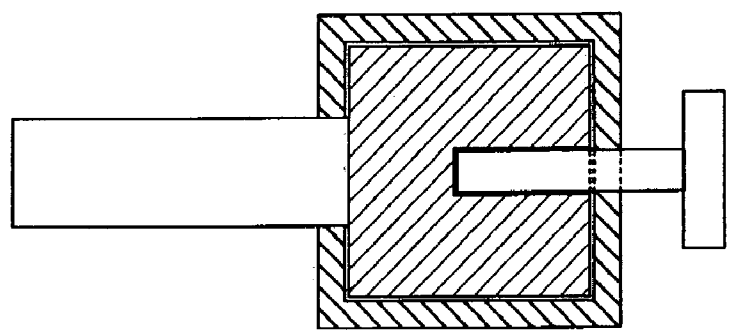
FIG. 1*d* is a sectional view taken on line 1*d*—1*d* of FIG. 1*e;*
Figure 1E:
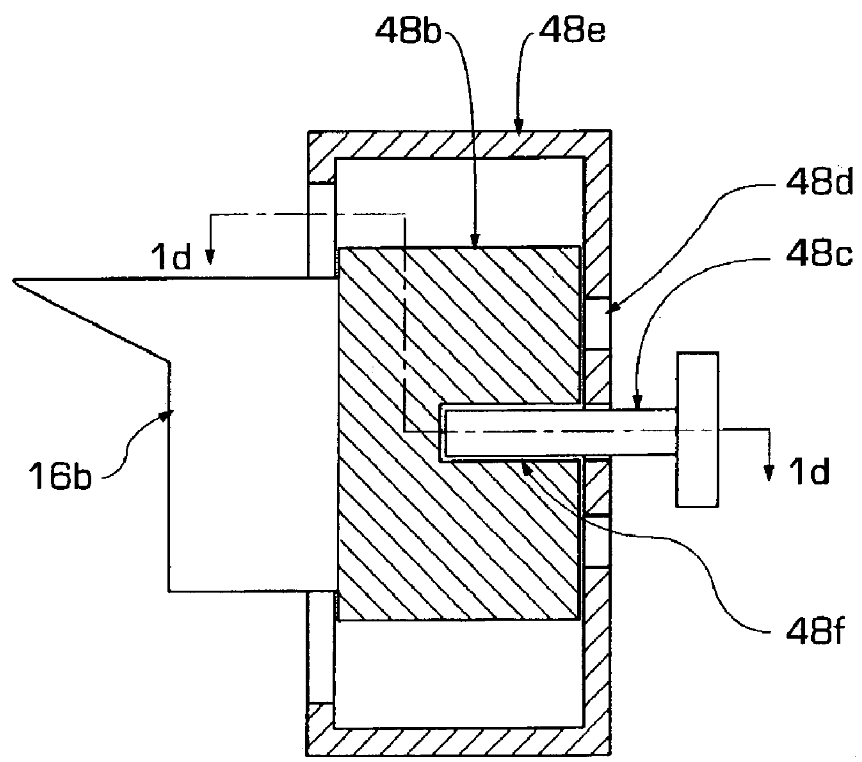
FIG. 1*e* is a sectional view of a segment of the portion shown in FIG. 1*c;*
Figure 1F:
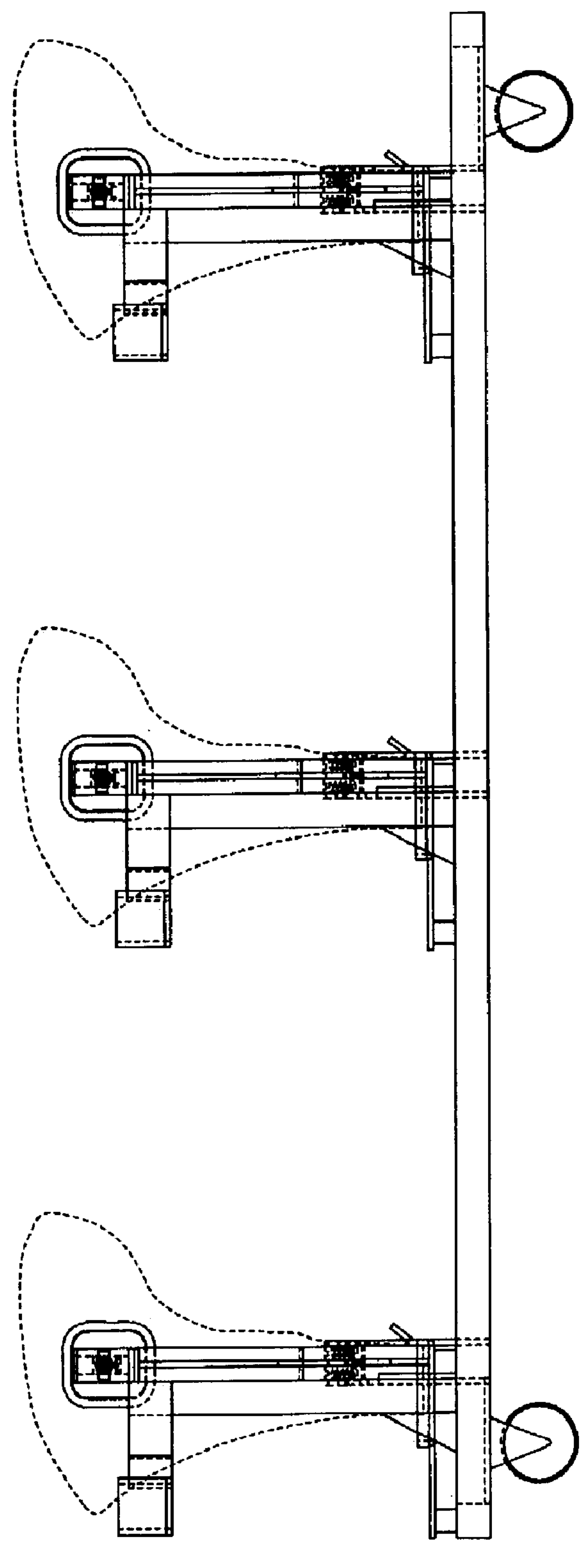
FIG. 1*f* is a side view of the transport device of FIG. 1.

The wheeled undercarriage 14 supports the frame 12 for travel along a floor surface. The frame includes a lower frame member 40 which is generally parallel with the floor surface. Referring to FIG. 4, each arm has an elongate portion extending between the capture formation 32 and the pin 16*b*, and each elongate portion is pivoted to the frame 12 by way of pivot 34 to a pivot post 34*a* upstanding from the lower frame member 40. The post 34*a* has a pair of flanges 34*b*, 34*c* extending on either side of the lower frame member 40, as viewed in FIG. 1. The elongate portion of each arm includes a first segment 42 adjacent the capture formation 32. The first segment is generally parallel to the lower frame member 40 when the instrument panel reaches its carry elevation relative to the frame. The first segment of each arm lies adjacent the frame member when the instrument panel reaches its carry elevation relative to the frame. Each arm includes a second segment 44 which is joined to the first segment 42 and has an included angle “θ” therewith of greater than about 90 degrees and less than about 180 degrees. The second segment 44 is upwardly angled from the first segment 42 when the instrument panel has reached its carry elevation. Each arm also includes a third segment 46 which is joined to the second segment 44 and has an included angle "β" therewith of greater than about 90 degrees and less than about 180 degrees. The third segment 46 is generally vertically directed when the instrument panel has reached its carry elevation and supports the pin 16*b*. Referring to FIGS. 1*c*, 1*d* and 1*e*, in this case, the upper end region of the third portion 46 is provided with a height adjustment assembly 48 for adjusting the height of pin 16*b* relative to the elevation of the capture formation, as shown by the dimension "h" in FIG. 5. In this case, the height adjustment assembly 48 includes a housing 48*a* with a block member 48*b* mounted therein for vertical movement between a number of elevations and held therein by locking pin 48*c* or another suitable means to fix, releasably, the block member 48*b* relative to the housing 48*a*. In this case, the housing has a number of passages 48*d* in its rear wall 48*e* and the block member has a passage 48*f* to receive the locking pin 48*c* when the passage in the block is aligned with one of the passages in the rear wall which correspond to the desired height of the pin 16*b*.

Alternatively, the pin 16*b* may be adjusted by a mechanical, hydraulic, pneumatic or electric arrangement, such as by a linkage, a number of gears, a pneumatic or hydraulic ram or motor, an electric motor or solenoid, or the like.

The pin 16*a* is, in this case, triangular in shape with the apex of the triangle section nearest the carry formation on the instrument panel. The cross-sectional area of the pin increases progressively away from the remote end thereof. This configuration enables the pin to engage the passages of different sizes in different instrument panels as can occur when different models of instruments panels are processed at the same location. However, other pins or, for that matter other carry formations, may also be used, if desired.

Figure 6:
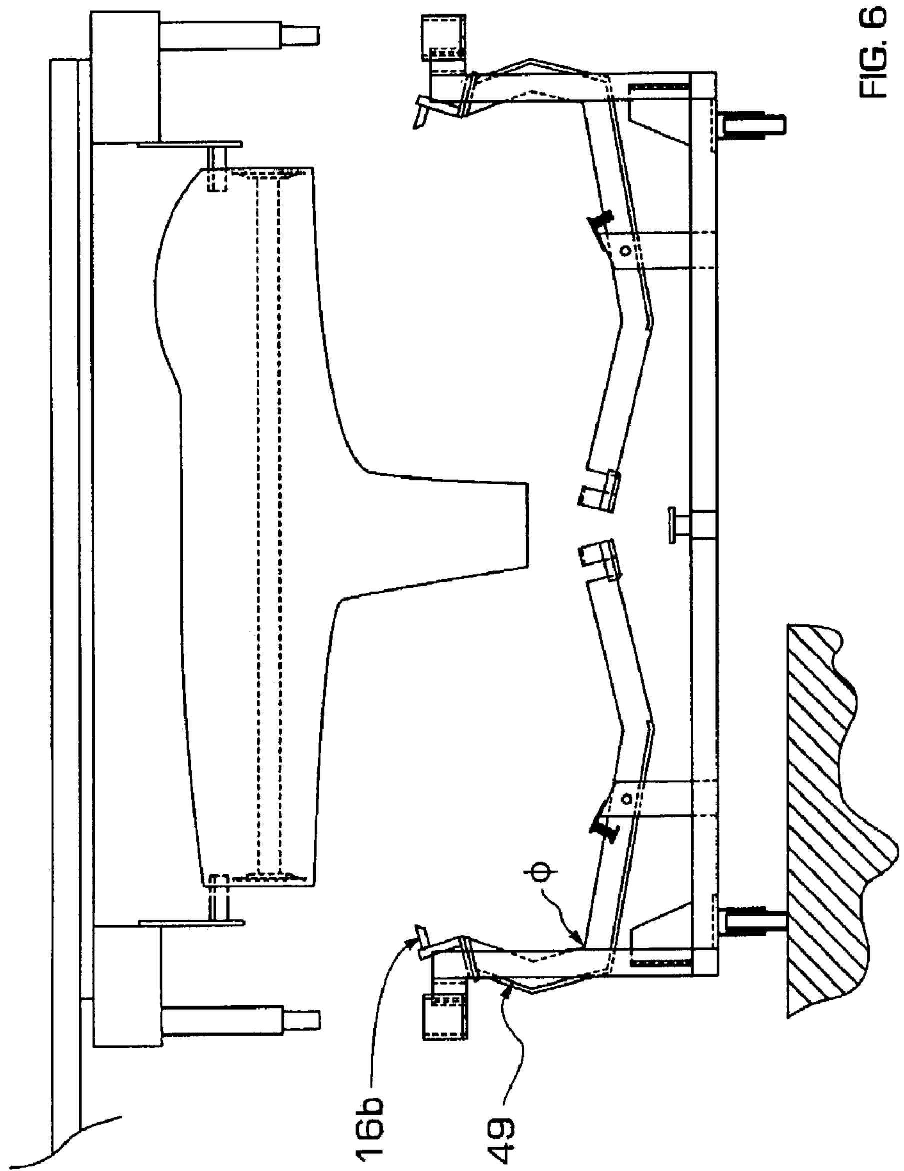
FIGS. 6, 7 and 8 are side views of an alternative transport device.
Figure 7:
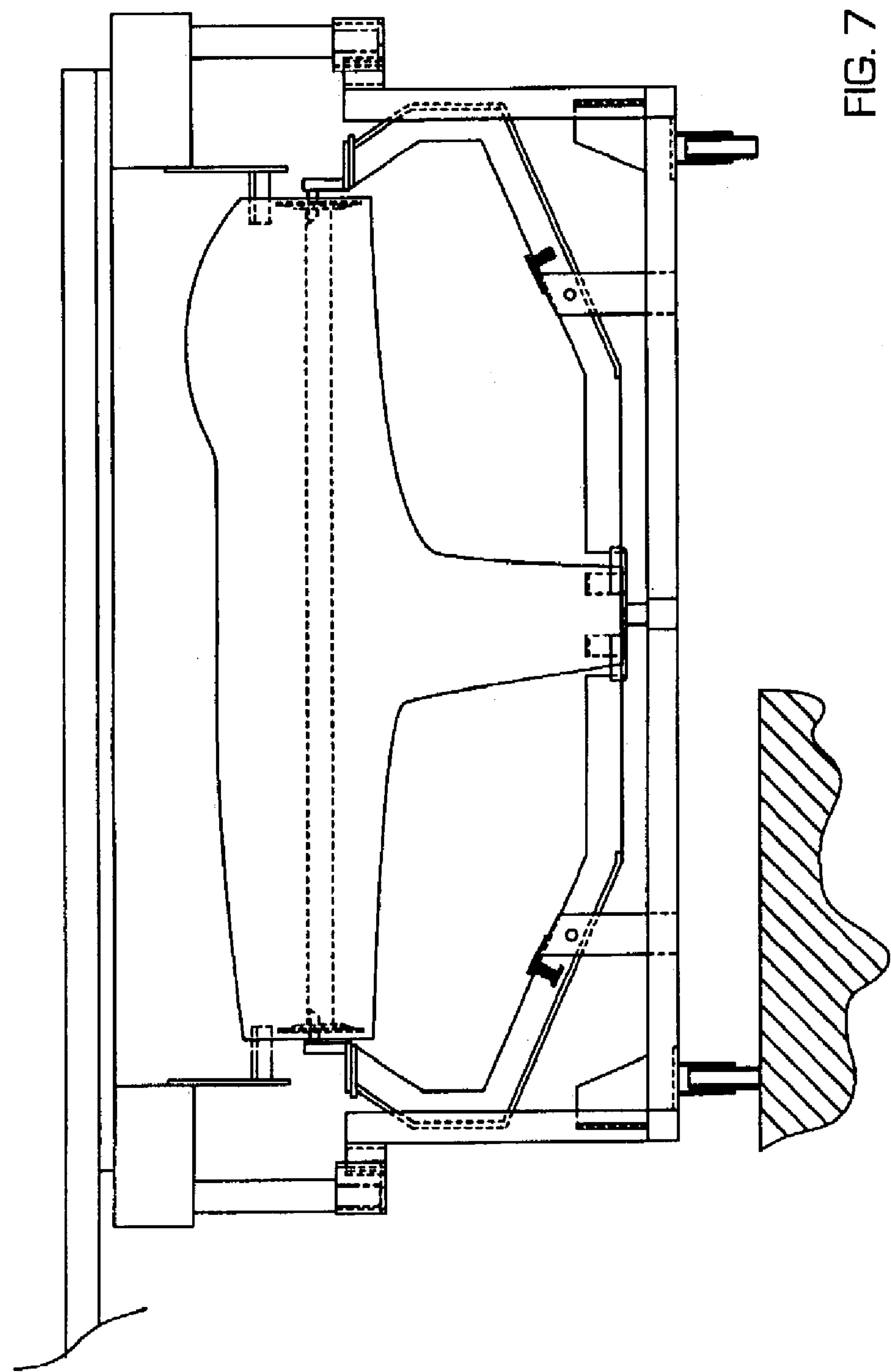
Figure 8:
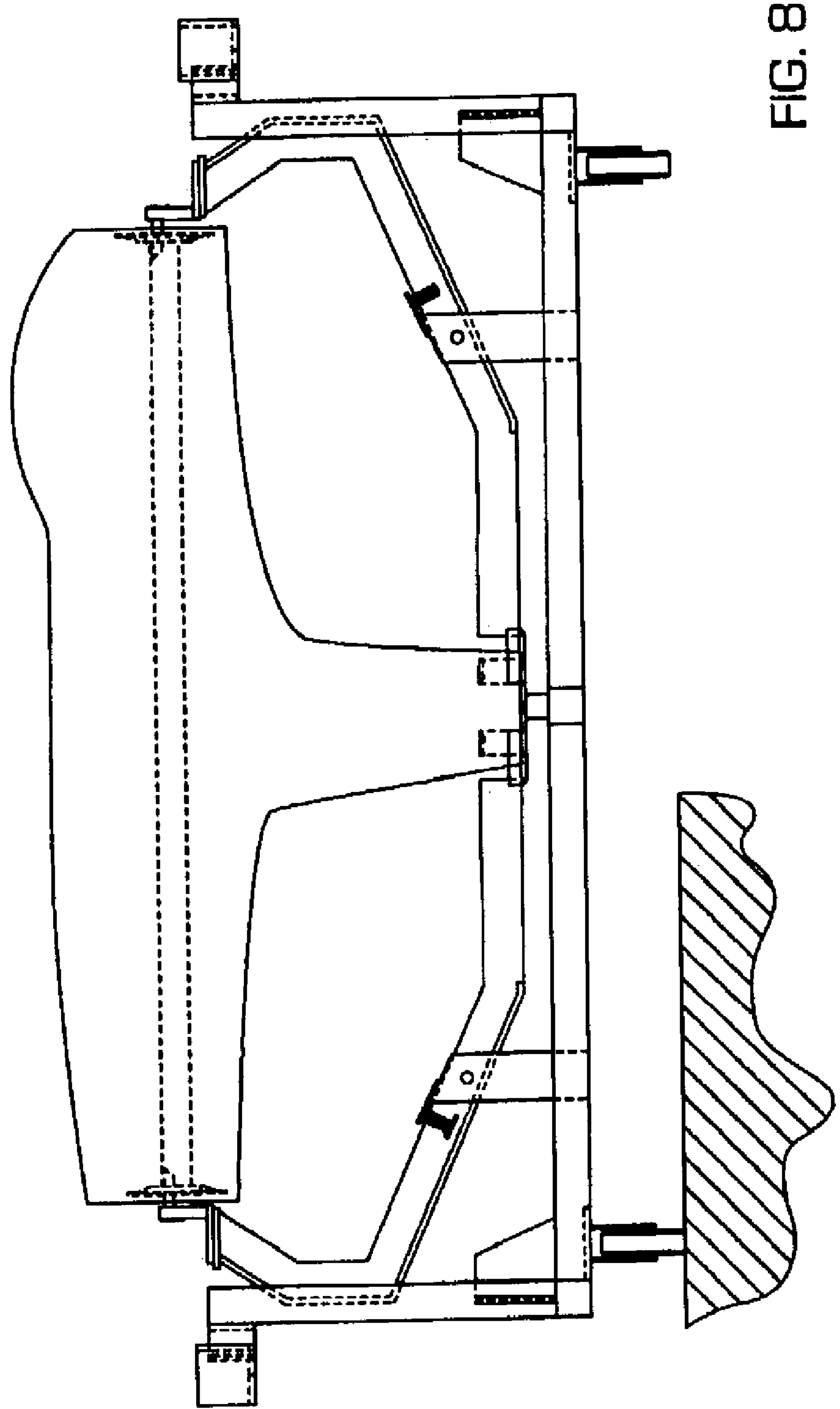

In the alternative version of FIG. 6, each arm further includes a fourth segment 49 which supports the pin 16*b* and which is joined to the third segment and has an included angle "ϕ" therewith of greater than about 90 degrees and less than about 180 degrees. In this case, the fourth segment is generally inwardly directed toward the side of the instrument panel when the instrument panel has reached its carry elevation. In this case, the fourth segment 49 supports the pin 16*b*.

Referring once again to FIG. 4, extending upwardly from the frame member 40 is a support member 50 which is positioned between the inner end sections of the arms when the instrument panel reaches its carry elevation. The arms are movable between a closed position as shown in FIG. 5 (where the pins 16*b* are positively engaged with the passages 20*a* of the instrument panel and where the first segments are lying adjacent the frame member) and an open position as shown in FIG. 4 (wherein the first segments are spaced from and lying above the frame member). The arms are further arranged to fall to the open position in the absence of an instrument panel, under the force of gravity or an external biasing source or both. In this case, a spring assembly is provided at 52 (as shown in FIGS. 1 and 4) to provide the biasing action and includes a pair of springs 52*a* between each second segment 44 and the corresponding post 34*a*.

In use, the device 10 is oriented next to the pickup location "p" as shown in FIG. 1*b*, where it can receive assembled instrument panels. In this case, a gantry mounted assist unit is used to transfer the assembled instrument panels from the assembly line to the device. In this case, the gantry assisted device clasps the instrument panel by a number of passages which are spaced from the passages 20*a* and is manoeuvred so that instrument panel is aligned with the arms of the carrier, that is by aligning the passages 20*a* with the pins 16*b*. In so doing, the lower column end portion is also manoeuvred to approach the capture formations 32, until such time as the lower column end portion makes contact with plate 32*a* and possibly peripheral wall 32*a* as well as the inclined portions 32*c*. As a result, the lower column end portions displace the capture formations 32 downwardly causing the arms 16 to rotate so that the pins approach the passages 20*a*. This rotation continues into the pins 16*b* positively engage the passages 20*b*, that is by entering the passages 20*b*. This is done by aligning the horizontal axis 20*c* both with the frame member 40, in other words keeping the axis in a generally horizontal orientation and maintaining the alignment of the passages 20*a* with their corresponding pins.

As the capture formations 32 displace downwardly, they arrive on opposite sides of the support post 50 and, therewith, form a surface on which to support the lower column end portion 22*a*. At that moment, the pins 16*b* are fully engaged with the passages 20*a*.

Figure 2:
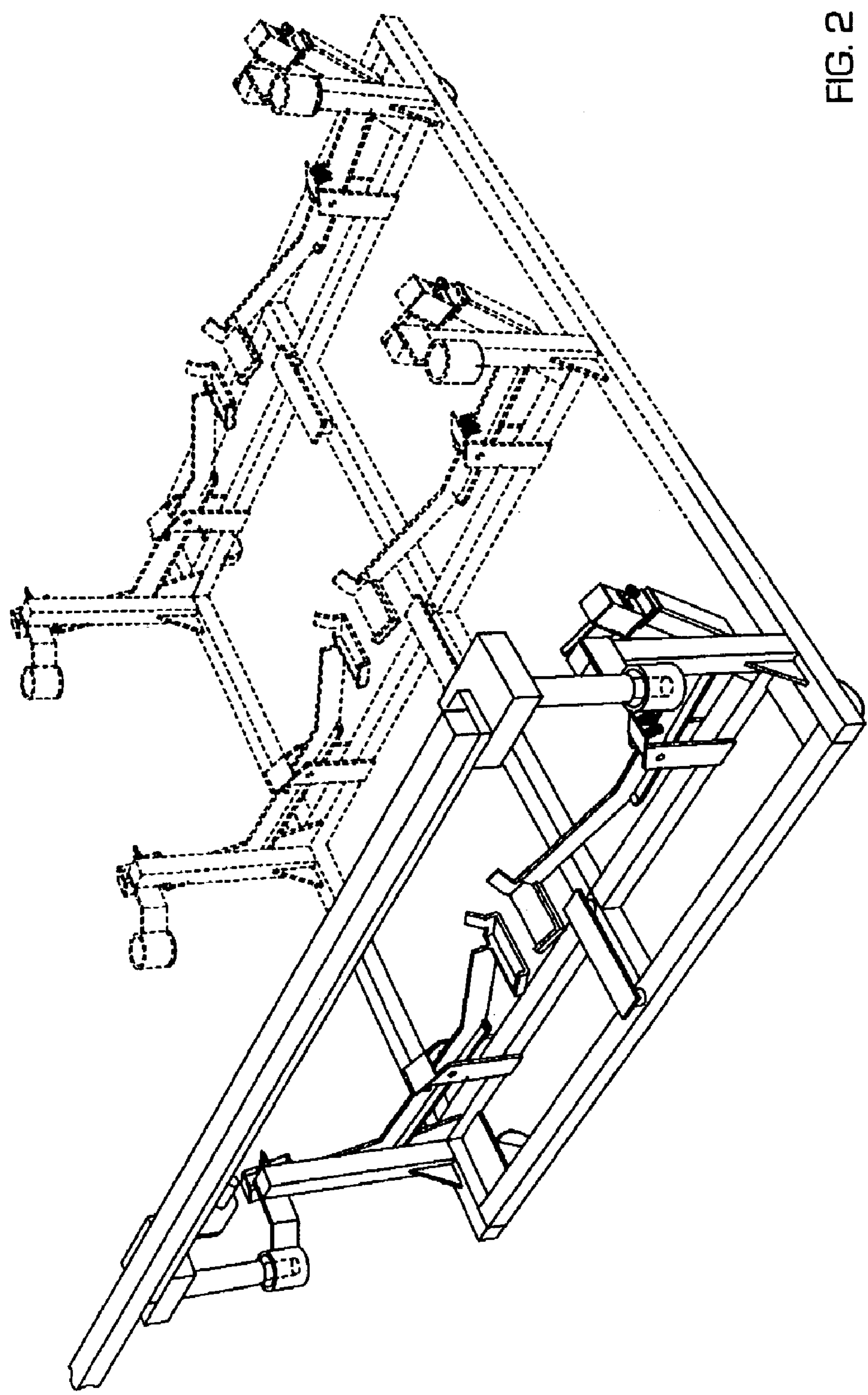
FIG. 2 is a fragmentary perspective view of the transport device of FIG. 1, together with a transfer device.
Figure 3:
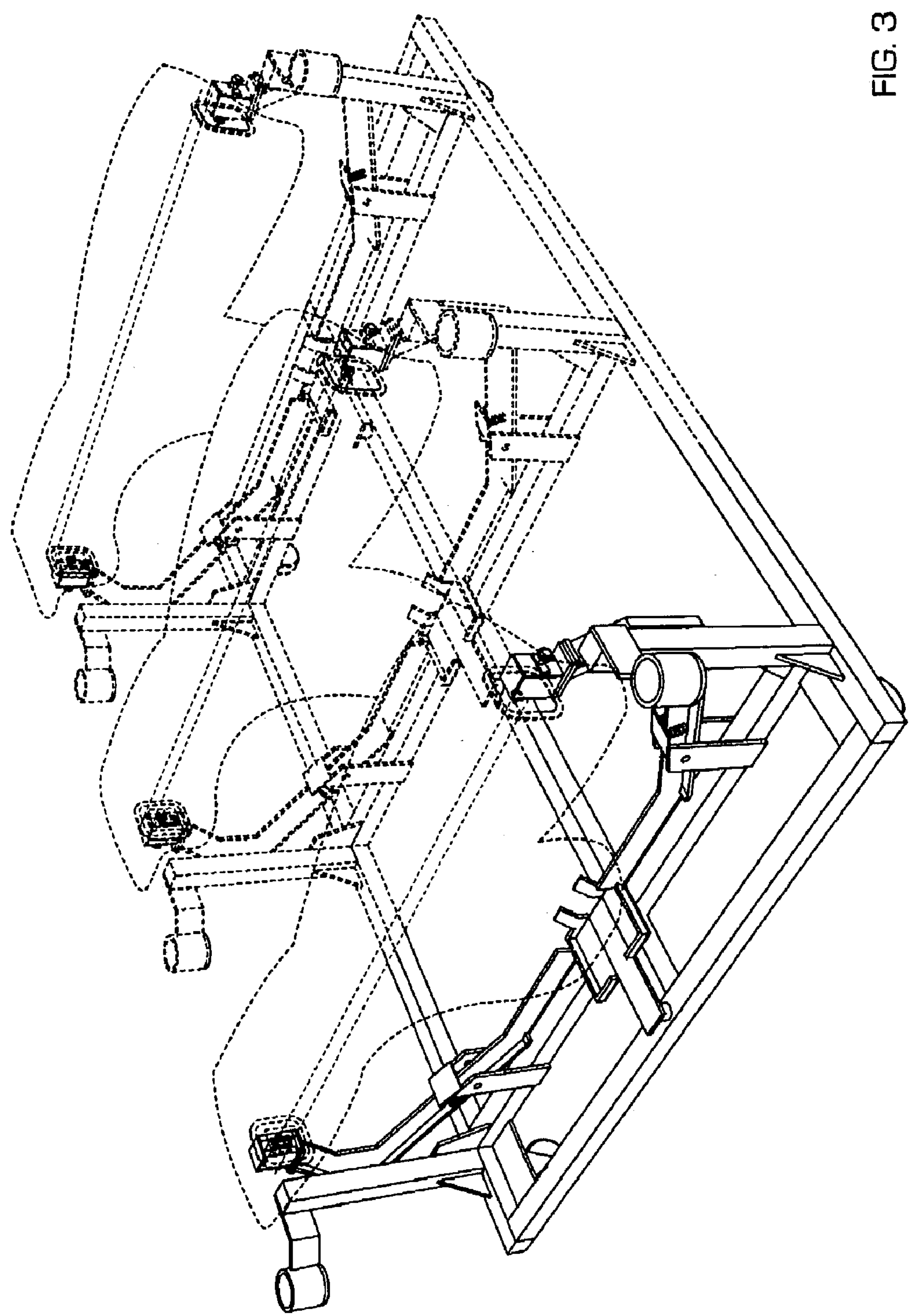
FIG. 3 is another fragmentary perspective view of the transport device of FIG. 1 in another operative position.

Referring to FIG. 4, the device 10 is used in conjunction with a robotic install unit 60 which is anchored to an external location in a manner not shown, to remove the instrument panels from the device 10 when the latter has been transferred to the unload location. In this case, the install unit 60 has a pair of pick-up units 62, each of which has a pair of retractable pins 64. The install unit 60 also has a pair of alignment posts 66 which are arranged to fit in cups 68 on the device 10. The install unit 60 is operable automatically to approach the device 10 and align the posts 66 with the cups 68 and to arrive at the position shown in FIG. 2. Once the install unit is at its precise location to clutch the instrument panel, the pins 64 are activated for the install unit 60 to be positively engaged with the instrument panel. The install unit 60 may then raise the instrument panel, causing the inner end sections of the arms to rise upwardly following the instrument panel while causing the pins 16*b* to become disengaged with the passages 20*a*, until the instrument panel is free from the cart as shown in FIG. 4.

Thus, because the device 10 is capable of positively engaging the instrument panel, it does so in a precise orientation which can, if desired, be matched to the actual orientation of the instrument panel when installed in the vehicle, eliminating extra steps to place the instrument panel in its proper orientation. The device positively engages the instrument panel on both ends and supports the instrument panel at its central column portion, resulting in a three point contact. This minimizes the undesirable torsional twisting found in earlier transport devices. The degree to which the engagement is made will depend on the degrees of play between the carry formations The degree of play can be selected as desired to ensure a robust coupling between the instrument panel and the cart, while not unduly constraining the instrument panel in a manner risking damage.

The device 10 is also useful because it can be arranged to carry more than one instrument panel at a time by providing, for example, two or more sets of arms, in order to carry two or more instrument panels. In this case, the device 10 has three sets of arms to carry three instrument panels.

Thus, the carry formations on the arms are complementary with the carry formations on the instrument panel. The carry formations may be reversed, namely by providing pins on the instrument panel and complementary passages on the arms. The instrument panel may be in some other form such as an instrument panel that is designed for an opposite driver seating position (i.e., on the right hand side of the vehicle) as compared to a North American vehicle where as a drivers seating position would be on the left hand side of the vehicle. The carry formations, in the device 10, are a pair of pins and a corresponding pair of passages. The pins and passages may be provided with complementary noncircular cross sections such as a multiple sided cross section such as an three, four, five, six or more sided cross section. Alternatively, the complementary formations may comprise other mechanical couplings such as mating gears and the like, as well as other non-mechanical couplings such as magnetic couplings. Each of the carry formations 16*b* may be in the form of a number of pins, for instance, or pins joined together with a web extending therebetween.

While the device 10 makes use of a wheeled undercarriage, it may also used in conjunction with other non-wheeled modes of transfer from one location to another, such as by using rollers, air suspension, magnetic levitation, or a combination of any one of these with a wheeled undercarriage. Alternatively, the device may be supported by a gantry or other transfer unit. The device 10 may also be confined to movement along a track or a conveyor or may be free to move in two or more axes.

While the carry arms are generally parallel with the elongate axis in the device 10, there may be other non parallel configurations as well, depending on the orientation of the instrument panel and its weight distribution around the elongate axis.

The device 10 may be applied to other articles such as engine drive trains and other subassemblies and components in other industries. The device 10 is particularly suited to those subassemblies and other articles that are of irregular shape, for example those having an oblong shape, or those having an elongate axis with an asymmetrical shape relative to the elongate axis, or an uneven weight distribution relative to the elongate axis.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of supporting automotive instrument panels on a carrier, comprising:

providing a frame, pivotally mounting a pair of carry arms to the frame in order to carry opposite sides of an instrument panel;

locating a carry formation on an outer end section of each carry arm for positively engaging a complementary carry formation on a corresponding side of the instrument panel;

locating an inner end section of each carry arm in order to obstruct the path of a central portion of the instrument panel as it reaches a carry elevation relative to the frame;

aligning the carry formations on the arms positively to engage the carry formations on the instrument panel while displacing the instrument panel toward the frame until the central portion of the instrument panel engages the central region on each carry arm;

displacing the instrument panel to cause a corresponding displacement of the central regions of the carry arms to advance the positive engagement of the carry formations between the instrument panel and the arms, until the instrument panel reaches a carry elevation relative to the frame.

2. A method as defined in claim 1 wherein the carry formation on each of the arms is at least one pin and the corresponding carry formation on the instrument panel includes at least one passage to receive the pin.

3. A method as defined in claim 2 wherein the central portion of the instrument panel includes a column having a lower column end portion, further comprising the steps of:

providing each inner end section of each arm with a capture formation, arranging each capture formation to form a seat for the central portion of the instrument panel when the instrument panel reaches a carry elevation relative to the frame.

4. A method as defined in claim 3, further including step of adjustably mounting the pin to the respective arm, so that the position of the pin may be adjusted relative thereto.

5. A method of supporting irregularly shaped articles on a carrier, comprising:

providing a frame;

pivotally mounting a pair of carry arms to the frame in order to carry opposite sides of an irregularly shaped article;

arranging the carry arms to lie in a common plane which is generally parallel with an elongate axis on the article;

locating a carry formation on an outer end section of each carry arm for positively engaging a complementary carry formation on a corresponding side of the article;

locating an inner end section of each carry arm in order to obstruct the path of a central portion of the article as it reaches a carry elevation relative to the frame;

aligning the carry formations on the arms positively to engage the carry formations on the article while displacing the article toward the frame until the central portion of the article engages the central region on each carry arm;

displacing the article to cause a corresponding displacement of the central regions of the carry arms to advance the positive engagement of the carry formations between the article and the arms, until the article reaches a carry elevation relative to the frame, wherein the step of locating a carry formation includes the step of providing at least one pin on the outer end section to be received by at least one passage on the article.

6. A method as defined in claim 5, further comprising the steps of providing the inner end section of each arm with a capture formation, and arranging the capture formations to form a seat for the central portion of the article when the article reaches a carry elevation relative to the frame.

7. A method as defined in claim 6, wherein the step of providing the inner end section of each arm with a capture formation includes the steps of locating a plate on the respective inner end section, and providing an upstanding peripheral wall on the plate to engage opposed laterally spaced side edge regions of the central portion.

8. A method as defined in claim 7, further comprising the step of laterally offsetting each plate relative to the corresponding arm.

9. A method as defined in claim 8, further comprising the steps of providing each arm with an elongate portion extending between the respective capture formation and the respective arm carry formation, and pivoting each elongate portion to the frame.

10. A method as defined in claim 9, further comprising the step of centrally locating a support member on the frame and positioning the support member to lie between the inner end sections of the arms when the article reaches a carry elevation.

11. A method as defined in claim 10, further comprising the step of positioning the support member substantially parallel with and between the plates to support the central portion when the article reaches a carry elevation.

12. A method as defined in claim 11, further comprising the step of aligning the upstanding peripheral walls of the capture formations with one another when the article reaches a carry elevation.

13. A method as defined in claim 12, further comprising the step of providing each upstanding peripheral wall with an inclined portion to guide the central portion.

14. A method as defined in claim 5, further comprising the step of adjusting each pin relative to the corresponding carry arm to adjust a carry elevation for the article.

15. A method as defined in claim 13, further comprising the step of adjusting the position of each arm carry formation relative to the respective capture formation.

16. A method as defined in claim 15, wherein the step of adjusting the position of each arm carry formation includes the steps of positioning a housing on each carry arm, mounting the respective pin for movement relative to the respective housing, and anchoring the respective pin relative to the respective housing.

17. A method as defined in claim 5, further comprising the step of biasing each arm toward an open position wherein the arms are ready to receive an article.

18. A method as defined in claim 17, further comprising the steps of extending a pair of posts upwardly from the frame, pivoting a corresponding carry arm thereon, the step of biasing including the step of locating at least one spring between each post and the corresponding carry arm.

19. A method as defined in claim 6 further comprising the steps of providing a wheeled undercarriage for supporting the frame along a floor surface, orienting a lower frame member of the frame generally parallel with the floor surface, providing each arm with an elongate portion having a first segment which is adjacent the respective capture formation, and orienting the first segment generally parallel to the lower frame member when the article reaches a carry elevation relative to the frame.

20. A method as defined in claim 19, further comprising the step of orienting the first segment of each arm to lie adjacent the frame when the article reaches a carry elevation relative to the frame.

21. A method as defined in claim 20, further comprising the step of disposing a second segment of each arm at angle relative to the respective first segment with an included angle therewith of greater than 90 degrees and less than 180 degrees.

22. A method as defined in claim 21, further comprising the steps of orienting a third segment of each arm at an angle relative to the respective second segment and with an included angle therewith of greater than 90 degrees and less than 180 degrees, and directing the third segment vertically when the article has reached a carry elevation, and supporting the respective arm carry formation on the third segment.

23. A method as defined in claim 22, further comprising the steps of moving the arms between a closed position where the carry formations of the arms are in positive engagement with the carry formations of the article and the first segments are adjacent the frame and an open position and wherein the first segments are inclined relative to the frame, and arranging the arms to fall to the open position in the absence of an article, under the force of gravity or a biasing source or both.

* * * * *